United States Patent
Choi et al.

(10) Patent No.: US 10,270,250 B2
(45) Date of Patent: Apr. 23, 2019

(54) INSULATION DESIGN APPARATUS OF HIGH VOLTAGE DIRECT CURRENT TRANSMISSION SYSTEM

(71) Applicant: LSIS CO., LTD., Anyang-si, Gyeonggi-do (KR)

(72) Inventors: Ho Seok Choi, Anyang-si (KR); Yong Kil Choi, Gunpo-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 510 days.

(21) Appl. No.: 14/793,420

(22) Filed: Jul. 7, 2015

(65) Prior Publication Data

US 2016/0149508 A1 May 26, 2016

(30) Foreign Application Priority Data

Nov. 26, 2014 (KR) .................. 10-2014-0166283

(51) Int. Cl.
*H02J 3/00* (2006.01)
*H02J 3/36* (2006.01)
(Continued)

(52) U.S. Cl.
CPC ........... *H02J 3/36* (2013.01); *H02J 2003/007* (2013.01); *H02M 5/4505* (2013.01); *H02M 7/19* (2013.01);
(Continued)

(58) Field of Classification Search
CPC ....... H02J 3/36; H02J 2003/007; Y02E 60/60; H02M 2007/4835; H02M 5/4505; H02M 7/7575; H02M 7/19
See application file for complete search history.

(56) References Cited

U.S. PATENT DOCUMENTS 4,057,736 A * 11/1977 Jeppson .................. F01K 13/00
290/1 R
2011/0025298 A1 * 2/2011 Gafvert .................. G01R 31/06
324/76.41

FOREIGN PATENT DOCUMENTS

| CN | 102185307 | * | 9/2011 | ............... H02J 3/36 |
| JP | 2003157291 | * | 11/2001 | ............. G06F 17/50 |

OTHER PUBLICATIONS

Astrom, et al. "Power Transmission with HVDC at Voltages Above 600 kV." Inaugural IEEE 2005 Conference and Exposition in Africa: Durban, South Africa (Jul. 2005) [retrieved from Jun. 26, 2017]. Retreived from <http://ieeexplore.ieee.org/document/1611783/#full-text-section>.*

(Continued)

*Primary Examiner* — Aniss Chad
*Assistant Examiner* — Alfred H B Wechselberger
(74) *Attorney, Agent, or Firm* — K&L Gates LLP

(57) ABSTRACT

An insulation design apparatus performing the insulation design of a high voltage direct current (HVDC) transmission system is provided. The insulation design apparatus includes a first insulation model generation unit; a second insulation model generation unit; an insulation verification unit, wherein the second insulation model generation unit selects the positions of each facility, device and arrester of the HVDC transmission system through a system single line diagram to select a representative facility in the HVDC transmission system, divides the HVDC transmission system into the plurality of regions based on the selected representative facility, and generates an insulation model for each region.

10 Claims, 13 Drawing Sheets

(51) Int. Cl.
　　　H02M 5/45　　　(2006.01)
　　　H02M 7/19　　　(2006.01)
　　　H02M 7/483　　 (2007.01)
　　　H02M 7/757　　 (2006.01)
(52) U.S. Cl.
　　　CPC .. H02M 7/7575 (2013.01); H02M 2007/4835
　　　　　　　　　　　　(2013.01); Y02E 60/60 (2013.01)

(56) References Cited

OTHER PUBLICATIONS

Fulchiron, D. "overvoltages and insulation coordination in MV and HV." [white paper] Cahier Technique No. 151: Merlin Gerin (Feb. 1995) [retrieved on Jun. 27, 2017]. Retrieved from <http://www.schneider-electric.com.eg/en/download/document/ECT151/>.*
IEEE Guide for the Application of Insulation Coordination. Technical Council of the IEEE Power Engineering Society. IEEE Std 1313.2-1999; Jun. 1999; ISBN 0-7381-1762-5.*
Hileman, A. "Insulation Coordination for Power Systems." CRC Taylor and Francis (1999); ISBN 978-0-8247-9957-1 [retrieved on Jun. 27, 2017]. Retrieved from <http://www.crcnetbase.com/ISBN/9781420052015>.*
Uglesic, I. "Modeling of Transmission Line and Substation for Insulation Coordination Studies." [training] Simulation and Analysis of Power System Transients with EMTP-RV; Dubrovnik, Croatia (Apr. 2009) [retrieved on Jun. 26, 2017]. Retreived from <http://emtp-software.com/system/files/EMTP_RV_IC.pdf>.*
J. Lucas "High Voltage Engineering" University of Moratuwa, Sri Lanka (2001), Chapter 10 [retrieved on Mar. 6, 2018]. Retrieved from <http://www.elect.mrt.ac.lk/HV_Chap10.pdf>.*
Volpov et al. "Implementation of Modern Methods of Insulation Coordination with Respect to Polluted Conditions in Design Practice of IECo" vol. 48 (2014) [retrieved on Mar. 7, 2018]. Retrieved from <http://www.seeei.org.il/prdFiles/3528_desc2.pdf>.*
Sangkakool et al. "A Computer Software for Insulation Co-Ordination According to IEC 60071-2" ECTI-CON (2010) [retreived on Mar. 7, 2018]; ISBN: 978-1-4244-5607-9. Retrieved from <http://ieeexplore.ieee.org/document/5491484/?source=IQplus>.*
Williams et al. "A method for optimal coordinated insulation design of transmission line" Australian Journal of Electrical and Electronics Engineering, vol. 7, No. 3 (2010) [retrieved on Mar. 7, 2018]. Retrieved from <https://www.tandfonline.com/doi/abs/10/1080/1448837X.2010.11464273>.*
K. H. Weck "Principles and procedures of insulation co-ordination" IEE Proceedings, vol. 134, Pt. C, No. 2 (1987) [retrieved on Mar. 7, 2018]. Retrieved from <http://ieeexplore.ieee.org/document/4647076/?source=IQplus>.*

Belenguer et al. "Experiences with a Knowledge-Based System for Insulation Coordination in Power System Design" AC and DC Power Transmission Conference No. 423 (1996) [retrieved on Mar. 7, 2018]. Retrieved from <http://ieeexplore.ieee.org/document/649152/?source=IQplus>.*
Sima et al. "Outdoor Insulation Coordination with Artifical Neural Network" IEEE International Symposium on Electrical Insulation: Indianapolis, IN (2004) [retrieved on Mar. 7, 2018]. Retrieved from <http://ieeexplore.ieee.org/document/1380572/?source=IQplus>.*
Izgi et al. "The Analysis and Simulation of Voltage Distribution over String Insulators Using Matlab/Simulink" Electrical Power Components and Systems, vol. 36 (2007) [retrieved fron Mar. 9, 2018]. Retrieved from STIC.*
Elahi et al. "Insulation Coordination Process for HVDC Converter Stations: Preliminary and Final Designs" IEEE Transactions on Power Delivery, vol. 3, No. 2 (1989) [retieved on Mar. 8, 2018]. Retrieved from <http://ieeexplore.ieee.org/abstract/document/25584/>.*
"IEEE Recommended Practice for Overvoltage and Insulation Coordination of Transmission Systems at 1000 kV AC and Above" IEEE 1862-2014 [retrieved on Jan. 9, 2019]. Retrieved from <https://ieeexplore.ieee.org/document/6861416> (Year: 2014).*
Dialynas et al. "Reliability Modeling and Evaluation of HVDC Power Transmission Systems" IEEE Transactions on Power Delivery, vol. 9, No. 2 [retrieved on Jan. 12, 2019]. Retrieved from <https://ieeexplore.ieee.org/abstract/document/296269/> (Year: 1994).*
Khatir et al. "Comparison of HVDC Line Models in PSB/SIMULINK Based on Steady-state and Transients Considerations" Acta Electronica et Informatica, vol. 8, No. 2, pp. 50-55 [retrieved on Jan. 11, 2019]. Retrieved from <https://pdfs.semanticscholar.org/fe6c/65353c9143c2e5d441deb01220f280eab0a1.pdf> (Year: 2008).*
Amarh, F. "Electric Transmission Line Flashover Prediction System" [thesis] Chapter 4, Power Systems Engineering Research Center, National Science Foundation [retrieved on Jan. 9, 2019]. Retrieved from <https://pserc.wisc.edu/documents/publications/reports/2001_reports/T-4_Final-Report_May-2001.pdf> (Year: 2001).*
Wang et al. "Numerical Solution of Potential and Electric Field Intensity in Field Domain of Valve Hall of DC Converter Station by Sub-model Method" Power Systems Technology [retrieved on Jan. 9, 2019]. Retrieved from <http://en.cnki.com.cn/Article_en/CJFDTotal-DWJS201109030.htm> (Year: 2011).*
Hause et al. "Simulation of an Electrical Network and Control System in SysML" Proceeding TMS/DEVS '12, Article No. 47; ISBN: 978-1-61839-786-7 [retrieved on Jan. 17, 2019]. Retrieved from <https://dl.acm.org/citation.cfm?id=2346663> (Year: 2012).*
Engelbrech et al. "Statistical dimensioning of insulators with respect to polluted conditions" IEEE Proceedings—Generation, Transmission and Distribution, vol. 151, Iss. 3 [retrieved on Jan. 11, 2019]. Retrieved from <https://ieeexplore.ieee.org/abstract/document/1306700/> (Year: 2004).*
Choi, et al., "HVDC Insulation Design and Modeling," Jul. 2014, 3 pages.

* cited by examiner

INSULATION DESIGN APPARATUS OF HIGH VOLTAGE DIRECT CURRENT TRANSMISSION SYSTEM

CROSS-REFERENCE TO RELATED APPLICATIONS

Pursuant to 35 U.S.C. § 119(a), this application claims the benefit of earlier filing date and right of priority to Korean Patent Application No. 10-2014-0166283, filed on Nov. 26, 2014, the contents of which are hereby incorporated by reference herein in its entirety.

BACKGROUND

The present disclosure relates to a high voltage direct current (HVDC) transmission system. In particular, the present disclosure relates to an insulation design method of an HVDC transmission system.

The HVDC transmission system transmits away electricity through an HVDC.

In general, the HVDC transmission system uses an aerial line or submarine cable to transmit electricity.

The HVDC transmission system is being widely utilized because it has advantages, such as low investment cost, no limitation in cable length, and little loss in power transmission.

Since the HVDC transmission system transmits electricity through the HVDC, the importance of an insulation design is high. A typical insulation design technique uses a way of multiplying an environmental factor and a pollution level by a defined voltage value. According to this technique, there are limitations in that calculation should be again performed each time a system varies, and the actual value of the HVDC transmission system is not applied to the insulation design. In particular, when actually applying to a system, there is inconvenience resulting from the need to re-design insulation according to each section or variation in voltage.

SUMMARY

Embodiments provide an insulation design apparatus and method that provide convenience in insulation design and remove inconvenience in design.

Embodiments also provide an insulation design apparatus and method that may divide a high-voltage direct current (HVDC) transmission system into a plurality of regions and perform insulation modeling on each region.

Embodiments also provide an insulation design apparatus and method that enable only an insulation design for a necessary specific region to be partially performed without re-analyzing an insulation design for the entire system when the HVDC transmission system varies.

Technical tasks to be achieved by proposed embodiments are not limited to the above-mentioned technical tasks and other technical tasks not mentioned will be able to be clearly understood by a person skilled in the art from the following descriptions.

In one embodiment, an insulation design apparatus performing the insulation design of a high voltage direct current (HVDC) transmission system includes a first insulation model generation unit generating an insulation model for the entire system of the HVDC transmission system; a second insulation model generation unit dividing the HVDC transmission system into a plurality of regions and generating an insulation model for each region; and an insulation verification unit verifying whether an insulation model generated through the first insulation model generation unit and a region-dependent insulation model generated through the second insulation model generation unit satisfy a desired withstanding voltage, wherein the second insulation model generation unit selects the positions of each facility, device and arrester of the HVDC transmission system through a system single line diagram to select a representative facility in the HVDC transmission system, divides the HVDC transmission system into the plurality of regions based on the selected representative facility, and generates an insulation model for each region.

The second insulation model generation unit may include: a data collection unit collecting data for dividing the HVDC transmission system into the plurality of regions, an insulation design region division unit dividing the HVDC transmission system into the plurality of regions based on the collected data, and an insulation modeling unit generating an insulation model for each of the plurality of regions divided through the insulation design region division unit.

The insulation design region division unit may divide the HVDC transmission system into regions including at least two of a transmission-side alternating current (AC) part, a transmission-side transformation part, a DC transmission part, a reception-side transformation part, a reception-side AC part, a transmission-side transformer part, a transmission-side AC/DC converter part, a reception-side DC/AC converter part, and a reception-side transformer part.

The second insulation model generation unit may further include a system insulation design unit separately applying a stress voltage to each region and calculating a region-dependent insulation distance based on the applied stress voltage.

The second insulation model generation unit may include: a region-dependent first modeling unit generating an insulation model for each region based on a maximum voltage in operation, and a region-dependent second modeling unit examining a change in insulation distance based on an environmental factor and modifies the region-dependent insulation model generated through the first modeling unit.

The first insulation model generation unit may include: a first insulation modeling unit modeling the HVDC transmission system based on the over-voltage and rated voltage of the HVDC transmission system and generating the insulation base model of the HVDC transmission system, an insulation level calculation unit performing the insulation calculation of the insulation base model and determining an insulation cooperation withstanding voltage suitable for performing the function of the insulation base model of the HVDC transmission system, a second insulation modeling unit modifying the insulation base model of the HVDC transmission system based on the insulation cooperation withstanding voltage and generating an insulation model of the HVDC transmission system, a rated insulation level calculation unit calculation a rated insulation level satisfying the reference withstanding voltage of the insulation model of the HVDC transmission system, and a system analysis unit analyzing the HVDC transmission system and calculating the over-voltage and rated voltage of the HVDC transmission system.

The first insulation model generation unit may further include a third insulation modeling unit modifying the insulation model of the HVDC transmission system based on a change in region-dependent impedance based on the region-dependent insulation model generated through the second insulation model generation unit to generate the modified insulation model.

The second insulation modeling unit may modify the insulation base model of the HVDC transmission system based on the difference between the actual operating state of the HVDC transmission system and the state of the insulation base model of the HVDC transmission system and the insulation cooperation withstanding voltage to generate the insulation model of the HVDC transmission system.

The difference between the actual operating state of the HVDC transmission system and the state of the insulation base model of the HVDC transmission system may include at least one of a difference in environmental factor, a difference in test of the components, a deviation in product characteristic, a difference in installation state, a difference in operating life, and a safety factor to be considered for safety.

The first insulation model generation unit may further include: a desired withstanding voltage calculation unit calculating the desired withstanding voltage of the insulation model of the HVDC transmission system, and a reference withstanding voltage calculation unit calculating the reference withstanding voltage of the insulation model of the HVDC transmission system from the desired withstanding voltage of the insulation model of the HVDC transmission system.

The reference withstanding voltage calculation unit may calculate the reference withstanding voltage of the insulation model of the HVDC transmission system from the desired withstanding voltage of the insulation model of the HVDC transmission system based on at least one of a test state, a test transformation factor, and a voltage range.

The rated insulation level may include the voltage values and distance values of one or more positions on the HVDC transmission system.

The insulation level calculation unit may perform the insulation calculation of the insulation base model of the HVDC transmission system based on at least one of the insulation characteristic of the insulation base model of the HVDC transmission system, the function of the insulation base model of the HVDC transmission system, the statistical distribution of data on the insulation base model of the HVDC transmission system, the inaccuracy of input data of the insulation base model of the HVDC transmission system, and a factor affecting a combination of the components of the insulation base model of the HVDC transmission system.

According to an embodiment, when the insulation design modeling is performed and an insulation design value is applied to the actual system, it is possible to provide convenience.

According to an embodiment, since there is no inconvenience resulting from the need to re-design all variables when a system design, voltage, environmental factor or pollution level varies, it is possible to provide convenience in applying insulation design.

According to an embodiment, by finding an insulation value for a change in applied voltage through modeling in order to remove inconvenience in insulation design, it is possible to provide convenience in insulation design and remove inconvenience in design.

According to an embodiment, by developing an insulation model related to HVDC insulation design and applying the model to an insulation design procedure to verify the design, it is possible to enhance the reliability of design basis compared to a typical design technique.

According to an embodiment, it is possible to decrease inconvenience resulting from the need to design a new system or re-design through much time and cost investment when there is a factor affecting design, compared to a typical technique having no model.

According to an embodiment, by dividing the entire system into a plurality of regions and performing insulation design modeling on each divided region, it is possible to achieve convenience in applying insulation design because there is a need to separately perform insulation design modeling on only a changed region without re-analyzing the insulation design of the entire system when a target system to be designed is changed.

The details of one or more embodiments are set forth in the accompanying drawings and the description below. Other features will be apparent from the description and drawings, and from the claims.

DETAILED DESCRIPTION OF THE EMBODIMENTS

Figure 1:
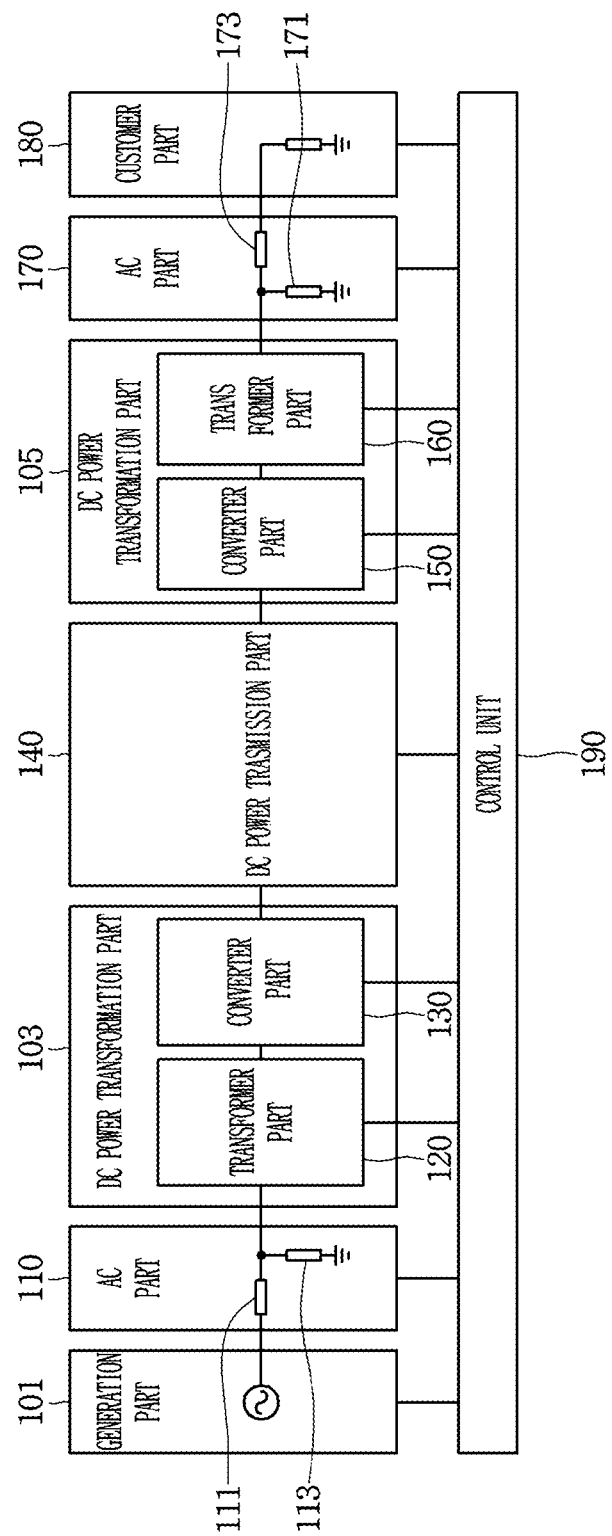
FIG. 1 is a diagram for explaining the configuration of a high voltage direct current (HVDC) transmission system according to an embodiment.

Advantages and features of the present invention, and implementation methods thereof will be clarified through the following embodiments described with reference to the accompanying drawings. The present invention may, however, be embodied in different forms and should not be construed as limited to the embodiments set forth herein.

Rather, these embodiments are provided so that this disclosure will be thorough and complete, and will fully convey the scope of the present invention to those skilled in the art. Further, the present invention is only defined by scopes of claims. Like reference numerals refer to like elements throughout.

In the following description of embodiments, a detailed description of known functions or configurations incorporated herein will not be provided when it is determined that the detailed description thereof may unnecessarily obscure the subject matter of the inventive concept. The terms which will be described below are terms defined in consideration of the functions in the present disclosure, and may be different according to users, intentions of the users, or customs. Therefore, the definitions of the terms should be determined based on the contents throughout the specification.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which are executed on the computer or other programmable apparatus provide steps for implementing the functions/acts specified in the flowchart and/or block diagram block or blocks.

Furthermore, the respective block diagrams may illustrate parts of modules, segments or codes including at least one or more executable instructions for performing specific logic function(s). Moreover, it should be noted that the functions of the blocks may be performed in different order in several modifications. For example, two successive blocks may be performed substantially at the same time, or may be performed in reverse order according to their functions.

FIG. 1 illustrates a high voltage direct current (HVDC) transmission system according to an embodiment.

As illustrated in FIG. 1, a HVDC system 100 according to an embodiment includes a power generation part 101, a transmission side alternating current (AC) part 110, a transmission side power transformation part 103, a direct current (DC) power transmission part 140, a customer side power transformation part 105, a customer side AC part 170, a customer part 180, and a control unit 190. The transmission side power transformation part 103 includes a transmission side transformer part 120, and a transmission side AC-DC converter part 130. The customer side power transformation part 105 includes a customer side DC-AC converter part 150, and a customer side transformer part 160.

The power generation part 101 generates three-phase AC power. The power generation part 101 may include a plurality of power generating plants.

The transmission side AC part 110 transmits the three-phase AC power generated by the generation part 101 to a DC power transformation substation including the transmission side transformer part 120 and the transmission side AC-DC converter part 130.

The transmission side transformer part 120 isolates the transmission side AC part 110 from the transmission side AC-DC converter part 130 and the DC power transmission part 140.

The transmission side AC-DC converter part 130 converts the three-phase AC power corresponding to the output of the transmission side transformer part 120 into DC power.

The DC power transmission part 140 transfers the transmission side DC power to the customer side.

The customer side DC-AC converter part 150 converts the DC power transferred by the DC power transmission part 140 into three-phase AC power.

The customer side transformer part 160 isolates the customer side AC part 170 from the customer side DC-AC converter part 150 and the DC power transmission part 140.

The customer side AC part 170 provides three-phase AC power corresponding to the output of the customer side transformer part 160 to the customer part 180.

The control unit 190 controls at least one of the power generation part 101, the transmission side AC part 110, the transmission side power transformation part 103, the DC power transmission part 140, the customer side power transformation part 105, the customer side AC part 170, the customer part 180, the control unit 190, the transmission side AC-DC converter part 130, and the customer side DC-AC converter part 150. Particularly, the control unit 190 may control the turn-on and turn-off timings of a plurality of valves in the transmission side AC-DC converter part 130 and the customer side DC-AC converter part 150. Here, the valves may correspond to a thyristor or an insulated gate bipolar transistor (IGBT).

Figure 2:
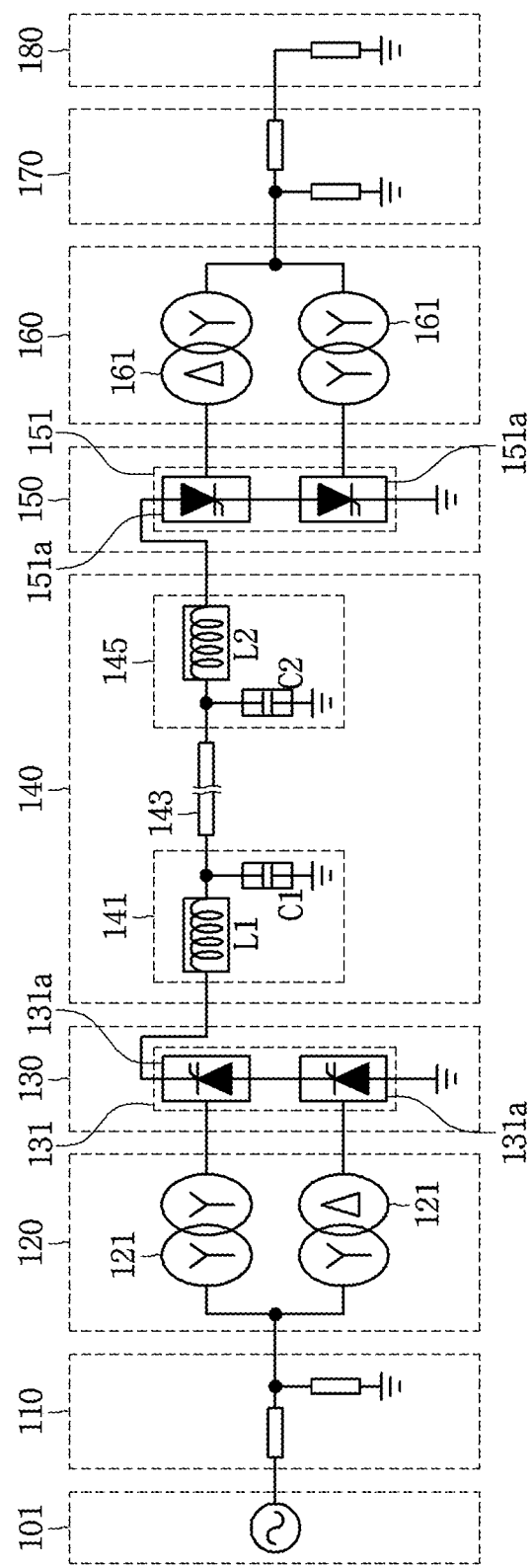
FIG. 2 is a diagram for explaining the configuration of a mono-polar HVDC transmission system according to an embodiment.

FIG. 2 illustrates a monopolar-type high voltage direct current (HVDC) transmission system.

Particularly, FIG. 2 illustrates a system which transmits DC power with a single pole. Hereinafter, the single pole is described on the assumption that it is a positive pole, but is not necessarily limited thereto.

The transmission side AC part 110 includes an AC power transmission line 111 and an AC filter 113.

The AC power transmission line 111 transfers the three-phase AC power generated by the generation part 101 to the transmission side power transformation part 103.

The AC filter 113 removes remaining frequency components other than the frequency component used by the power transformation part 103 from the transferred three-phase AC power.

The transmission side transformer part 120 includes one or more transformers 121 for the positive pole. For the positive pole, the transmission side AC-DC converter part 130 includes an AC-positive pole DC converter 131 which generates positive pole DC power, and the AC-positive pole DC converter 131 includes one or more three-phase valve bridges 131*a* respectively corresponding to the one or more transformers 121.

When one three-phase valve bridge 131*a* is used, the AC-positive pole DC converter 131 may generate positive pole DC power having six pulses by using the AC power.

Here, a primary coil and a secondary coil of one of the transformers 121 may have a Y-Y connection or a Y-delta (Δ) connection.

When two three-phase valve bridges 131a are used, the AC-positive pole DC converter 131 may generate positive pole DC power having 12 pulses by using the AC power. Here, a primary coil and a secondary coil of one of the two transformers 121 may have a Y-Y connection, and a primary coil and a secondary coil of the other of the two transformers 121 may have a Y-Δ connection When three three-phase valve bridges 131a are used, the AC-positive pole DC converter 131 may generate positive pole DC power having 18 pulses by using the AC power. The more the number of the pulses of the positive pole DC power becomes, the lower the price of the filter becomes.

The DC power transmission part 140 includes a transmission side positive pole DC filter 141, a positive pole DC power transmission line 143, and a customer side positive pole DC filter 145.

The transmission side positive pole DC filter 141 includes an inductor L1 and a capacitor C1 and performs DC filtering on the positive pole DC power output by the AC-positive pole DC converter 131.

The positive pole DC power transmission line 143 has a single DC line for transmission of the positive pole DC power, and the earth may be used as a current feedback path. One or more switches may be disposed on the DC line.

The customer side positive pole DC filter 145 includes an inductor L2 and a capacitor C2 and performs DC filtering on the positive pole DC power transferred through the positive pole DC power transmission line 143.

The customer side DC-AC converter part 150 includes a positive pole DC-AC converter 151 and one or more three-phase valve bridges 151a.

The customer side transformer part 160 includes, for the positive pole, one or more transformers 161 respectively corresponding to one or more three-phase valve bridges 151a.

When one three-phase valve bridge 151a is used, the positive pole DC-AC converter 151 may generate AC power having six pulses by using the positive pole DC power. Here, a primary coil and a secondary coil of one of the transformers 161 may have a Y-Y connection or a Y-delta (Δ) connection.

When two three-phase valve bridges 151a are used, the positive pole DC-AC converter 151 may generate AC power having 12 pulses by using the positive pole DC power. Here, a primary coil and a secondary coil of one of the two transformers 161 may have a Y-Y connection, and a primary coil and a secondary coil of the other of the two transformers 161 may also have a Y-Δ connection.

When three three-phase valve bridges 151a are used, the positive pole DC-AC converter 151 may generate AC power having 18 pulses by using the positive pole DC power. The more the number of the pulses of the AC power becomes, the lower the price of the filter becomes.

The customer side AC part 170 includes an AC filter 171 and an AC power transmission line 173.

The AC filter 171 removes frequency components other than the frequency component (for example, 60 Hz) used by the customer part 180 from the AC power generated by the customer side power transformation part 105.

The AC power transmission line 173 transfers the filtered AC power to the customer part 180.

Figure 3:
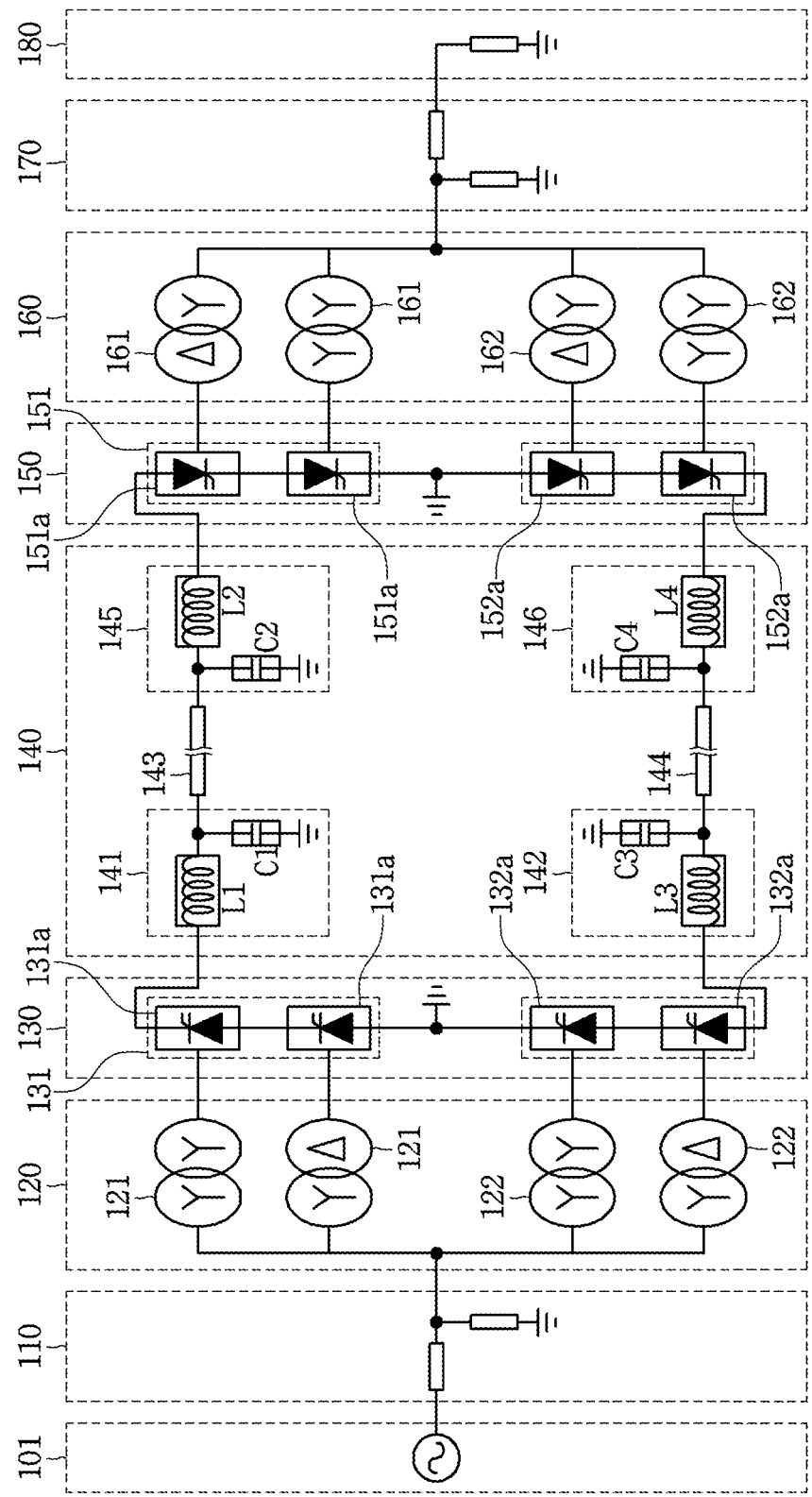
FIG. 3 is a diagram for explaining the configuration of a bipolar HVDC transmission system according to an embodiment.

FIG. 3 illustrates a bipolar type HVDC transmission system according to an embodiment.

Particularly, FIG. 3 illustrates a system which transmits DC power with two poles. Hereinafter, the two poles are described assuming a positive pole and a negative pole, but are not necessarily limited thereto.

The transmission side AC part 110 includes an AC transmission line 111 and an AC filter 113.

The AC power transmission line 111 transfers the three-phase AC power generated by the generation part 101, to the transmission side power transformation part 103.

The AC filter 113 removes frequency components other than the frequency component used by the power transformation part 103 from the transferred three-phase AC power.

The transmission side transformer part 120 includes one or more transformers 121 for the positive pole, and one or more transformers 122 for the negative pole. The transmission side AC-DC converter part 130 includes an AC-positive pole DC converter 131 which generates positive pole DC power and an AC-negative pole DC converter 132 which generates negative pole DC power. The AC-positive pole DC converter 131 includes one or more three-phase valve bridges 131a respectively corresponding to the one or more transformers 121 for the positive pole. The AC-negative pole DC converter 132 includes one or more three-phase valve bridges 132a respectively corresponding to the one or more transformers 122 for the negative pole.

When one three-phase valve bridge 131a is used for the positive pole, the AC-positive pole DC converter 131 may generate positive pole DC power having six pulses by using the AC power. Here, a primary coil and a secondary coil of one of the transformers 121 may have a Y-Y connection or a Y-delta (Δ) connection.

When two three-phase valve bridges 131a are used for the positive pole, the AC-positive pole DC converter 131 may generate positive pole DC power having 12 pulses by using the AC power. Here, a primary coil and a secondary coil of one of the two transformers 121 may have a Y-Y connection, and a primary coil and a secondary coil of the other of the two transformers 121 may have a Y-Δ connection.

When three three-phase valve bridges 131a are used for the positive pole, the AC-positive pole DC converter 131 may generate positive pole DC power having 18 pulses by using the AC power. The more the number of the pulses of the positive pole DC power becomes, the lower the price of the filter becomes.

When one three-phase valve bridge 132a is used for the negative pole, the AC-negative pole DC converter 132 may generate negative pole DC power having six pulses. Here, a primary coil and a secondary coil of one of the transformers 122 may have a Y-Y connection or a Y-delta (Δ) connection.

When two three-phase valve bridges 132a are used for the negative pole, the AC-negative pole DC converter 132 may generate negative pole DC power having 12 pulses. Here, a primary coil and a secondary coil of one of the two transformers 122 may have a Y-Y connection, and a primary coil and a secondary coil of the other of the two transformers 122 may have a Y-Δ connection.

When three three-phase valve bridges 132a are used for the negative pole, the AC-negative pole DC converter 132 may generate negative pole DC power having 18 pulses. The more the number of the pulses of the negative pole DC power becomes, the lower the price of the filter becomes.

The DC power transmission part 140 includes a transmission side positive pole DC filter 141, a transmission side negative pole DC filter 142, a positive pole DC power transmission line 143, a negative pole DC power transmission line 144, a customer side positive pole DC filter 145, and a customer side negative pole DC filter 146.

The transmission side positive pole DC filter 141 includes an inductor L1 and a capacitor C1 and performs DC filtering on the positive pole DC power output by the AC-positive pole DC converter 131.

The transmission side negative pole DC filter 142 includes an inductor L3 and a capacitor C3 and performs DC filtering on the negative pole DC power output by the AC-negative pole DC converter 132.

The positive pole DC power transmission line 143 has a single DC line for transmission of the positive pole DC power, and the earth may be used as a current feedback path. One or more switches may be disposed on the DC line.

The negative pole DC power transmission line 144 has a single DC line for transmission of the negative pole DC power, and the earth may be used as a current feedback path. One or more switches may be disposed on the DC line.

The customer side positive pole DC filter 145 includes an inductor L2 and a capacitor C2 and performs DC filtering on the positive pole DC power transferred through the positive pole DC power transmission line 143.

The customer side negative pole DC filter 146 includes an inductor L4 and a capacitor C4 and performs DC filtering on the negative pole DC power transferred through the negative pole DC power transmission line 144.

The customer side DC-AC converter part 150 includes a positive pole DC-AC converter 151 and a negative pole DC-AC converter 152. The positive pole DC-AC converter 151 includes one or more three-phase valve bridges 151*a* and the negative pole DC-AC converter 152 includes one or more three-phase valve bridges 152*a*.

The customer side transformer part 160 includes, for the positive pole, one or more transformers 161 respectively corresponding to one or more three-phase valve bridges 151*a*, and for the negative pole, one or more transformers 162 respectively corresponding to one or more three-phase valve bridges 152*a*.

When one three-phase valve bridge 151*a* is used for the positive pole, the positive pole DC-AC converter 151 may generate AC power having six pulses by using the positive pole DC power. Here, a primary coil and a secondary coil of one of the transformers 161 may have a Y-Y connection or a Y-delta (Δ) connection.

When two three-phase valve bridges 151*a* are used for the positive pole, the positive pole DC-AC converter 151 may generate AC power having 12 pulses by using the positive pole DC power. Here, a primary coil and a secondary coil of one of the two transformers 161 may have a Y-Y connection, and a primary coil and a secondary coil of the other of the two transformers 161 may have a Y-Δ connection.

When three three-phase valve bridges 151*a* are used for the positive pole, the positive pole DC-AC converter 151 may generate AC power having 18 pulses by using the positive pole DC power. The more the number of the pulses of the AC power becomes, the lower the price of the filter becomes.

When one three-phase valve bridge 152*a* is used for the negative pole, the negative pole DC-AC converter 152 may generate AC power having six pulses by using the negative pole DC power. Here, a primary coil and a secondary coil of one of the transformers 162 may have a Y-Y connection or a Y-delta (Δ) connection.

When two three-phase valve bridges 152*a* are used for the negative pole, the negative pole DC-AC converter 152 may generate AC power having 12 pulses by using the negative pole DC power. Here, a primary coil and a secondary coil of one of the two transformers 162 may have a Y-Y connection, and a primary coil and a secondary coil of the other of the two transformers 162 may have a Y-Δ connection.

When three three-phase valve bridges 152*a* are used for the negative pole, the negative pole DC-AC converter 152 may generate AC power having 18 pulses by using the negative pole DC power. The more the number of the pulses of the AC power become, the lower the price of the filter becomes.

The customer side AC part 170 includes an AC filter 171 and an AC power transmission line 173.

The AC filter 171 removes frequency components other than the frequency component (for example, 60 Hz) used by the customer part 180 from the AC power generated by the customer side power transformation part 105.

The AC power transmission line 173 transfers the filtered AC power to the customer part 180.

Figure 4:
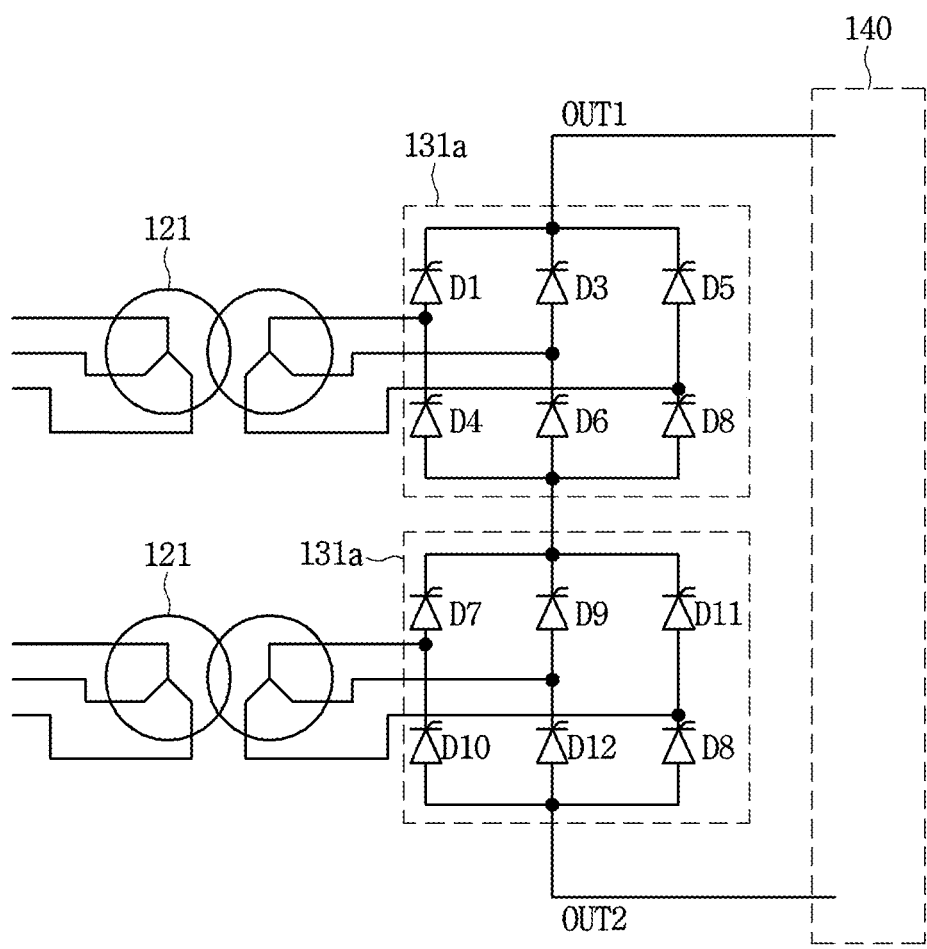
FIG. 4 is a diagram for explaining the connection of a transformer and a three-phase valve bridge according to an embodiment.

FIG. 4 illustrates a connection between a transformer and a three-phase valve bridge according to an embodiment.

Particularly, FIG. 4 illustrates the connection between the two transformers 121 for the positive pole and the two three-phase valve bridges 131*a* for the positive pole. Since the connection between the two transformers 122 for the negative pole and the two three-phase valve bridges 132*a* for the negative pole, the connection between the two transformers 161 for the positive pole and the two three-phase valve bridges 151*a* for the positive pole, the connection between the two transformers 162 for the negative pole and the two three-phase valve bridges 152*a* for the negative pole, the connection between the one transformer 121 for the positive pole and the one three-phase valve bridge 131*a* for the positive pole, the connection between the one transformer 161 for the positive pole and the one three-phase valve bridge 151*a* for the positive pole, etc., could be easily derived from the embodiment of FIG. 4, drawings and descriptions thereof will not be provided herein.

In FIG. 4, the transformer 121 having the Y-Y connection is referred to as an upper transformer, the transformer 121 having the Y-Δ connection is referred to as a lower transformer, the three-phase valve bridge 131*a* connected to the upper transformer is referred to as upper three-phase valve bridge, and the three-phase valve bridge 131*a* connected to the lower transformer is referred to as lower three-phase valve bridge.

The upper three-phase valve bridge and the lower three-phase valve bridge have two output terminals outputting DC power, i.e., a first output terminal OUT1 and a second output terminal OUT2.

The upper three-phase valve bridge includes six valves D1 to D6, and the lower three-phase valve bridges include six valves D7 to D12.

The valve D1 has a cathode connected to the first output terminal OUT1 and an anode connected to a first terminal of the secondary coil of the upper transformer.

The valve D2 has a cathode connected to the anode of the valve D5 and an anode connected to the anode of the valve D6.

The valve D3 has a cathode connected to the first output terminal OUT1 and an anode connected to a second terminal of the secondary coil of the upper transformer.

The valve D4 has a cathode connected to the anode of the valve D1 and an anode connected to the anode of the valve D6.

The valve D5 has a cathode connected to the first output terminal OUT1 and an anode connected to a third terminal of the secondary coil of the upper transformer.

The valve D6 has a cathode connected to the anode of the valve D3.

The valve D7 has a cathode connected to the anode of the valve D6 and an anode connected to a first terminal of the secondary coil of the lower transformer.

The valve D8 has a cathode connected to the anode of the valve D11 and an anode connected to a second output terminal OUT2.

The valve D9 has a cathode connected to the anode of the valve D6 and an anode connected to a second terminal of the secondary coil of the lower transformer.

The valve D10 has a cathode connected to the anode of the valve D7 and an anode connected to the second output terminal OUT2.

The valve D11 has a cathode connected to the anode of the valve D6 and an anode connected to a third terminal of the secondary coil of the lower transformer.

The valve D12 has a cathode connected to the anode of the valve D9 and an anode connected to the second output terminal OUT2.

Meanwhile, the customer side DC-AC converter part 150 may be configured as a modular multi-level converter 200.

The modular multi-level converter 200 may convert DC power into AC power by using a plurality of sub-modules 210.

Figure 5:
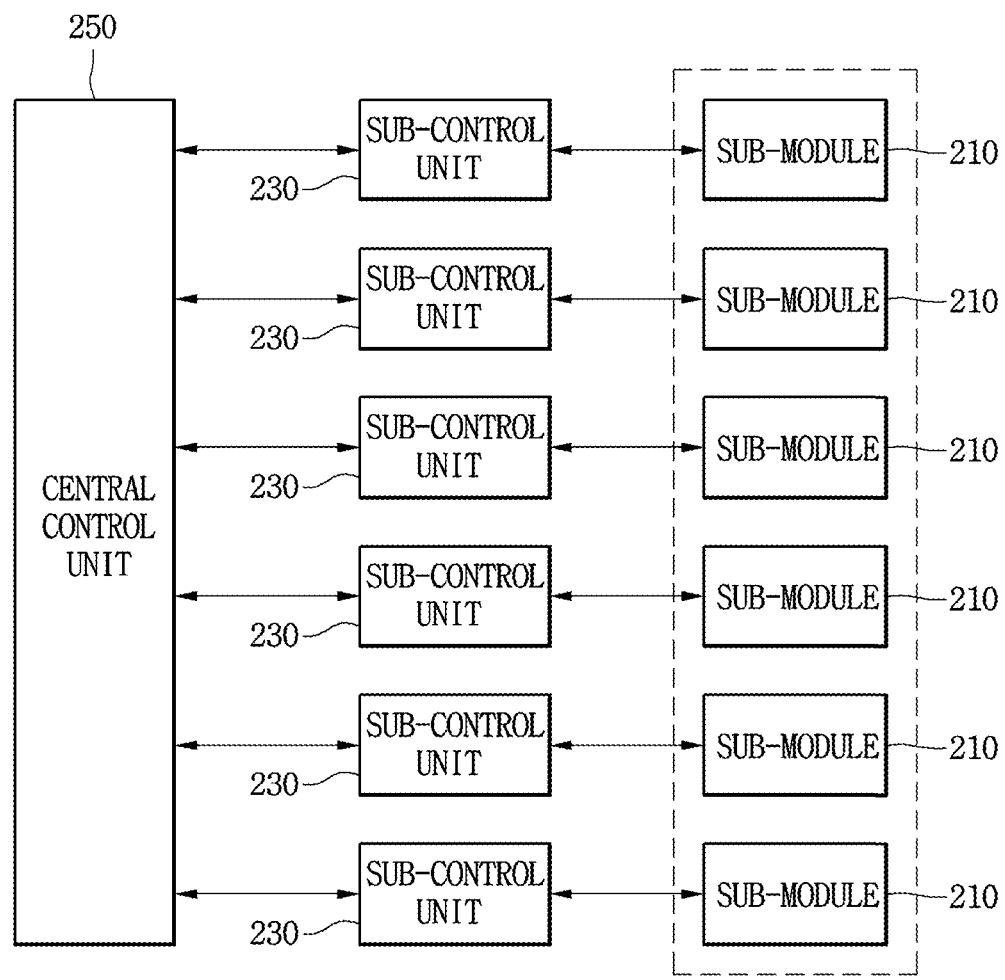
FIG. 5 is a block diagram of a modular multi-level converter according to an embodiment.
Figure 6:
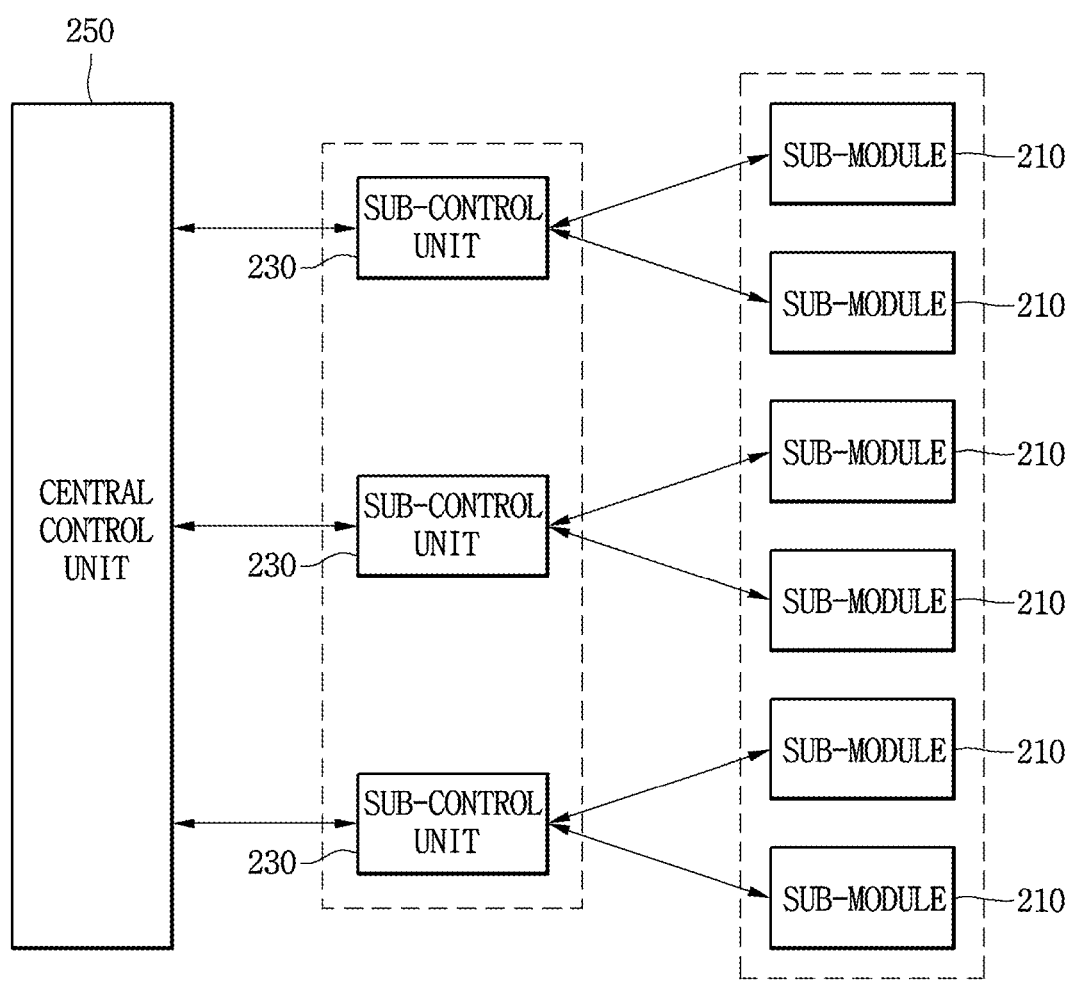
FIG. 6 is a block diagram of a modular multi-level converter according to another embodiment.

Referring to FIGS. 5 and 6, the configuration of the modular multi-level converter 200 will be described.

FIGS. 5 and 6 are block diagrams illustrating a modular multi-level converter 200.

The modular multi-level converter 200 includes a central control unit 250, a plurality of sub-control units 230 and a plurality of sub-modules 210.

The central control unit 250 controls the plurality of sub-control units 230, and the sub-control units 230 may respectively control the sub-modules 210 connected thereto.

Here, as illustrated in FIG. 5, one sub-control unit 230 is connected to one sub-module 210, and accordingly, may control the switching operation of the one sub-module 210 connected thereto based on a control signal transferred through the central control unit 250.

Also, alternatively, as shown in FIG. 6, one sub-control unit 230 is connected to a plurality of sub-modules 210, and accordingly, may confirm each of the control signals for the plurality of sub-modules 210 connected thereto based on a plurality of control signals transferred through the central control unit 250; each of the plurality of sub-modules 210 may be controlled based on the confirmed control signal.

The central control unit 250 determines the operation condition of the plurality of sub-modules 210, and generates a control signal to control the operation of the plurality of sub-modules 210 according to the determined operation condition.

The operation condition may include a discharging operation, a charging operation, and a bypassing operation.

Here, different addresses are assigned to the plurality of sub-modules 210, respectively.

Preferably, the addresses, which sequentially increase from the front according to the arranged sequence of the sub-modules, are assigned to the plurality of sub-modules 210, respectively.

That is, the sub-module 210 may perform any one of the discharging operation, the charging operation, and the bypassing operation after receiving DC power.

The sub-module 210 includes a switching element having a diode, and accordingly, may perform any one of the discharging operation, the charging operation, and the bypassing operation of the sub-module 210 by a switching operation and the rectifying operation of the diode.

Each of the sub-control unit 230 receives a switching signal for controlling the plurality of sub-modules 210 through the central control unit 250, and controls the switching operation of the sub-module 210 according to the received switching signal.

That is, the central control unit 250 may control the overall operations of the modular multi-level converter 200.

The central control unit 250 may measure the current and voltage of the AC parts 110 and 170 and Dc power transmission part 140, which are interconnected thereto.

Also, the central control unit 250 may calculate an overall control value.

Here, the overall control value may be a target value for the voltage, current, frequency of the output AC power of the modular multi-level converter 200.

The central control unit 250 may calculate an overall control value based on one or more of the current and the voltage of the AC parts 110 and 170 which are interconnected with the modular multi-level converter 200 and the current and the voltage of the DC power transmission part 140.

Meanwhile, the central control unit 250 may also control the operation of the modular multi-level converter 200 based on one or more from the reference active power, the reference reactive power, the reference current, the reference voltage received from an upper layer control unit (not shown) through a communications apparatus (not shown).

The central control unit 250 may transmit and receive data to/from the sub-control unit 230.

Here, the central control unit 250 described herein assigns addresses according to the arranged sequence of the plurality of sub-modules 210, and determines the switching sequence of the plurality of sub-modules 210 by using the assigned addresses.

That is, in general, all the sub-modules 210 do not operate under the same switching conditions, but a certain sub-module performs a charging operation or a bypassing operation according to the present required voltage, and the remaining sub-modules perform a discharging operation.

Accordingly, the central control unit 250 should firstly determine the sub-module which will perform the discharging operation.

Here, as the discharging operation is performed, the service life of the plurality of sub-modules 210 may be increased only if the plurality of sub-modules 210 perform the discharging operations within balanced frequencies with each other.

In other words, when a discharging operation frequency of a certain sub-module is high, the service life of the sub-module is turned out to be lower than that of other sub-modules having a low discharging operation frequencies.

Accordingly, it is very important to more rapidly determine the switching conditions of the plurality of sub-modules 210 while the balance of the switching frequencies of the plurality of sub-modules 210 is maintained.

Thus, in the embodiments, the switching sequence of the plurality of sub-modules 210 is determined according to the sequence of the addresses which are sequentially assigned.

For example, when there are sub-modules which are assigned with addresses 1 to 5 respectively, the central control unit 250 allows the discharging operations to be performed from the address 1. Here, the number of the sub-modules, in which the discharging operations are performed, is determined on the basis of a charged voltage value and a target value of each of the plurality of sub-modules.

That is, the central control unit 250 determines the switching conditions such that the sum of the charged voltage values of the plurality of sub-modules reach the target value. In other words, if power corresponding to the target value may be output by discharging even when the sub-modules assigned with address 1 and 2 are discharged, the central control unit 250 allows only the sub-modules assigned with addresses 1 and 2 to perform the discharging operations.

In addition, when determining the next switching condition, the central control unit 250 determines that a discharge operation is performed starting from a sub-module next to the sub-module having the latest address among the sub-modules previously performing discharging operations.

This will be described below in more detail.

Figure 7:
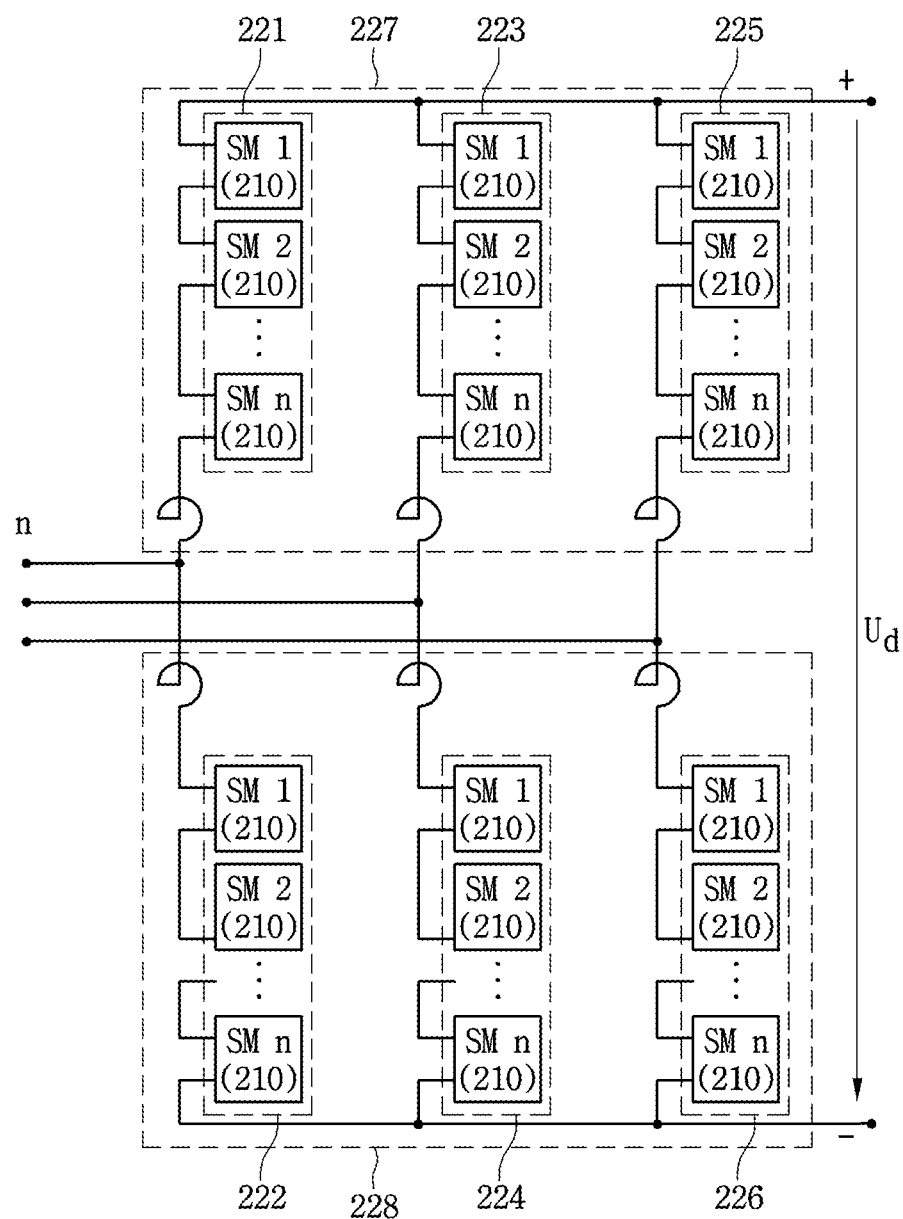
FIG. 7 represents the connection of a plurality of sub modules according to an embodiment.

Referring to FIG. 7, description will be given of connections of the plurality of sub-modules 210 included in the modular multi-level converter 200.

FIG. 7 illustrates connections of the plurality of sub-modules 210 included in the modular multi-level converter 200.

Referring to FIG. 7, the plurality of sub-modules 210 may be serially connected, and the plurality of sub-modules 210 connected to a positive pole or negative pole of one phase may constitute one arm.

The three-phase modular multi-level converter 200 may normally include six arms, and include a positive pole and a negative pole for each of the three-phases A, B, and C to form the six arms.

Accordingly, the three-phase modular multi-level converter 200 may include: a first arm 221 including a plurality of sub-modules for a positive pole of phase A; a second arm 222 including a plurality of sub-modules for a negative pole of phase A; a third arm 223 including a plurality of sub-modules for a positive pole of phase B; a fourth arm 224 including a plurality of sub-modules for a negative pole of phase B; a fifth arm 225 including a plurality of sub-modules for a positive pole of phase C; and a sixth arm 226 including a plurality of sub-modules for a negative pole of phase C.

Also, the plurality of sub-modules 210 for one phase may constitute a leg.

Accordingly, the three-phase modular multi-level converter 200 may include a phase A leg 227 including a plurality of sub-modules 210 for phase A; a phase B leg 228 including a plurality of sub-modules 210 for phase B; and a phase C leg 229 including a plurality of sub-modules 210 for phase C.

Therefore, the first to six arms 221 to 226 are respectively included in the phase A leg 227, the phase B leg 228, and phase C leg 229.

Specifically, in the phase A leg 227, the first arm 221, which is the positive pole arm of phase A, and the second arm 222, which is the negative pole arm of phase A, are included; and in the phase B leg 228, the third arm 223, which is the positive pole arm of phase B, and the fourth arm 224, which is the negative pole arm of phase B, are included. Also, in the phase C leg 229, the fifth arm 225, which is the positive pole arm of phase C, and the sixth arm 226, which is the negative pole arm of phase C, are included Also, the plurality of sub-modules 210 may constitute a positive pole arm 227 and a negative pole arm 228 according to polarity.

Specifically, referring to FIG. 7, the plurality of sub-modules 210 included in the modular multi-level converter 200 may be classified, with respect to a neutral line n, into a plurality of sub-modules 210 corresponding to the positive pole and a plurality of sub-modules 210 corresponding to the negative pole.

Thus, the modular multi-level converter 200 may include a positive arm 227 including the plurality of sub-modules 210 corresponding to the positive pole, and a negative arm 228 including the plurality of sub-modules 210 corresponding to the negative pole.

Accordingly, the positive pole arm 227 may include the first arm 221, the third arm 223, and the fifth arm 225; and the negative pole arm 228 may include the second arm 222, the fourth arm 224, and the sixth arm 226.

Figure 8:
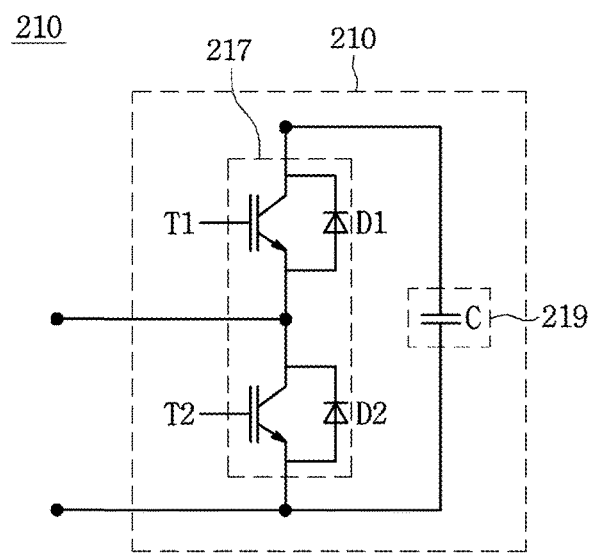
FIG. 8 illustrates the configuration of a sub module according to an embodiment.

Next, referring to FIG. 8, the configuration of the sub-module 210 is described.

FIG. 8 is an exemplary view illustrating a configuration of the sub-module 210.

Referring to FIG. 8, the sub-module 210 includes two switches, two diodes, and a capacitor. Such a shape of the sub-module 210 is also referred to as a half-bridge shape or a half bridge inverter.

In addition, the switch included in a switching part 217 may include a power semiconductor.

Here, the power semiconductor refers to a semiconductor element for a power apparatus, and may be optimized for the conversion or control of electric power. Also, the power semiconductor is referred to as a valve unit.

Accordingly, the switch included in the switching part 217 may include a power semiconductor, for example, may include an insulated gate bipolar transistor (IGBT), a gate turn-off thyristor, an integrated gate commutated thyristor, etc.

The storage part 219 includes the capacitor, and thus may charge or discharge energy. Meanwhile, the sub-module 210 may be represented as an equivalent model based on the configuration and the operation of the sub-module 210.

Figure 9:
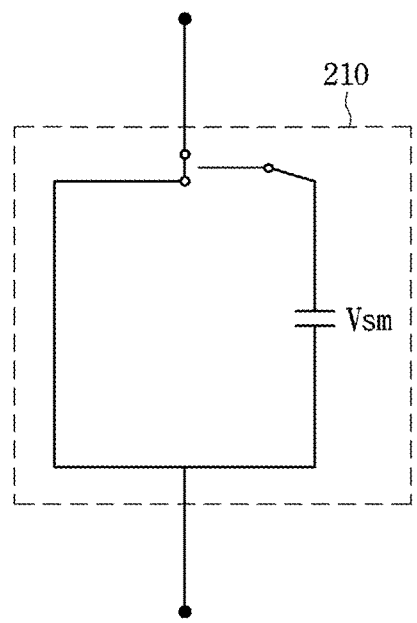
FIG. 9 represents the equivalent model of a sub module according to an embodiment.

FIG. 9 illustrates an equivalent model of the sub-module 210, and referring to FIG. 9, the sub-module 210 may be illustrated as an energy charge and discharge unit including a switch and a capacitor.

Accordingly, it may be turned out that the sub-module 210 is the same as an energy charge and discharge unit having an output voltage of Vsm.

Next, referring to FIGS. 10 to 13, the operation of the sub-module 210 will be described.

The switch part 217 of the sub-module 210 of FIGS. 10 to 13 includes a plurality of switches T1 and T2, and each of the switches is connected to each of diodes D1 and D2. Also, the storage part 219 of the sub-module 210 includes a capacitor.

Figure 10:
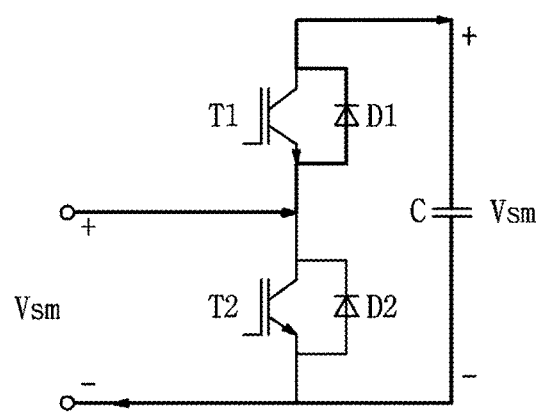
FIGS. 10, 11, 12 and 13 represent the operation of a sub module according to an embodiment of the present invention.
Figure 11:
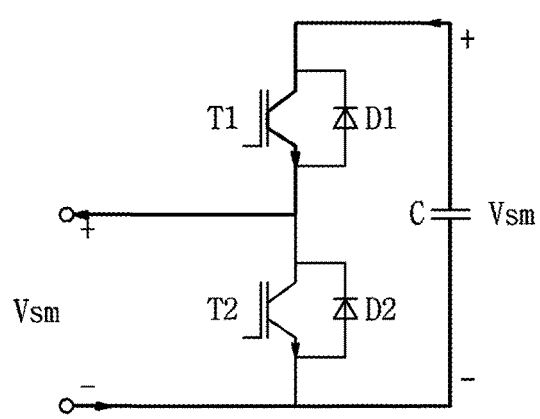

Referring to FIGS. 10 and 11, the charging and discharging operations of the sub-module 210 will be described.

FIGS. 10 and 11 illustrate formation of the capacitor voltage Vsm of the sub-module 210.

FIGS. 10 and 11 illustrate a state in which the switch T1 of the switching part 217 is turned on and the switch T2 is turned off. Accordingly, the sub-module 210 may form the capacitor voltage according to each of the switching operations.

Specifically, referring to FIG. 10, the current introduced into the sub-module 210 is transferred to the capacitor via the diode D1 and thus forms the capacitor voltage. Then, the formed capacitor voltage may charge energy into the capacitor.

Also, the sub-module 210 may perform discharging operation of discharging the charged energy.

Specifically, referring to FIG. 11, the stored energy of the capacitor, which is energy charged into the sub-module 210, is discharged via the switch T1. Accordingly, the sub-module 210 may discharge the stored energy.

Figure 12:
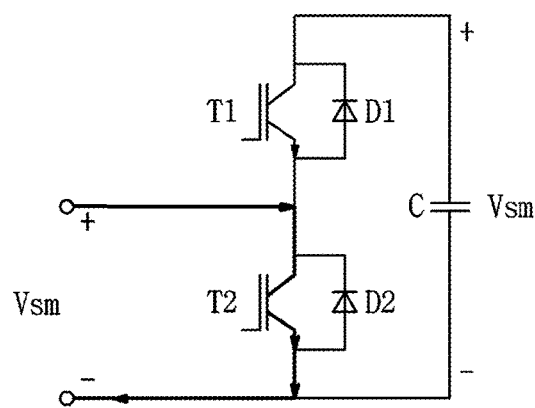
Figure 13:
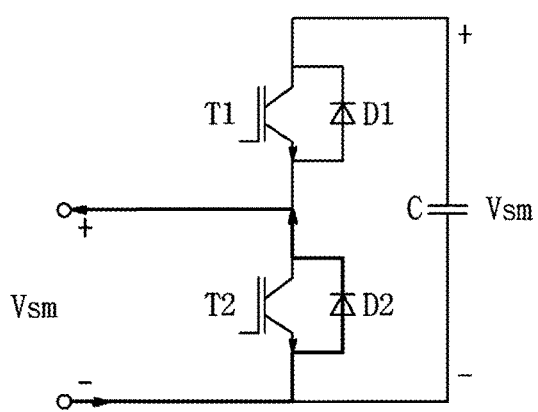

Referring to FIGS. 12 and 13, the bypassing operation of the sub-module 210 will be described.

FIGS. 12 and 13 illustrate the formation of a zero voltage of the sub-module 210.

FIGS. 12 and 13 illustrate a state in which the switch T1 of the switching part 217 is turned off and the switch T2 is turned-on. Accordingly, current does not flow to the capacitor of the sub-module 210, and the sub-module 210 may form a zero voltage.

Specifically, referring to FIG. 12, the current introduced into the sub-module 210 is output through the switch T2 and the sub-module may form a zero voltage.

Also, referring to FIG. 13, the current introduced into the sub-module 210 is output through the diode D2 and the sub-module 210 may form a zero voltage.

In this way, the sub-module 210 may form the zero voltage, and thus perform the bypassing operation in which the current does not flow into the sub-module 210 but bypasses the sub-module 210.

Figure 14:
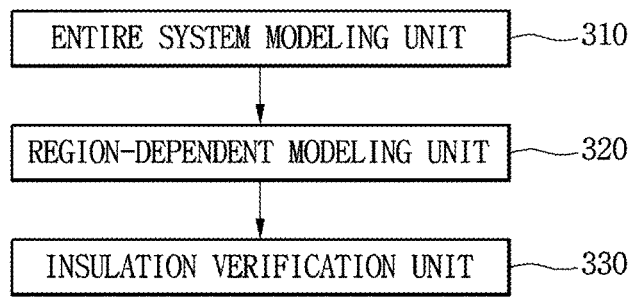
FIG. 14 is a block diagram showing the configuration of an insulation design apparatus of an HVDC transmission system according to an embodiment.

FIG. 14 is a block diagram showing the configuration of an insulation design apparatus of an HVDC transmission system according to an embodiment.

As shown in FIG. 14, an insulation design apparatus 300 of an HVDC transmission system includes an entire system modeling unit 310, a region-dependent modeling unit 320 and an insulation verification unit 330.

The entire system modeling unit 310 generates an insulation model based on the entire configuration of the HVDC transmission system.

The region-dependent modeling unit 320 divides the HVDC transmission system into a plurality of regions and generates an insulation model for each region.

In this case, when the region-dependent insulation model is generated through the region-dependent modeling unit 320, the entire system modeling unit 310 modifies the insulation model of the entire system based on the generated region-dependent insulation model.

In this example, the modification of the insulation model of the entire system is performed according to the regions divided through the region-dependent modeling unit 320 and a variation in impedance.

The insulation verification unit 330 verifies whether an insulation model finally generated through the entire system modeling unit 310 and the region-dependent insulation model generated through the region-dependent modeling unit 320 satisfies a desired withstanding voltage.

Figure 15:
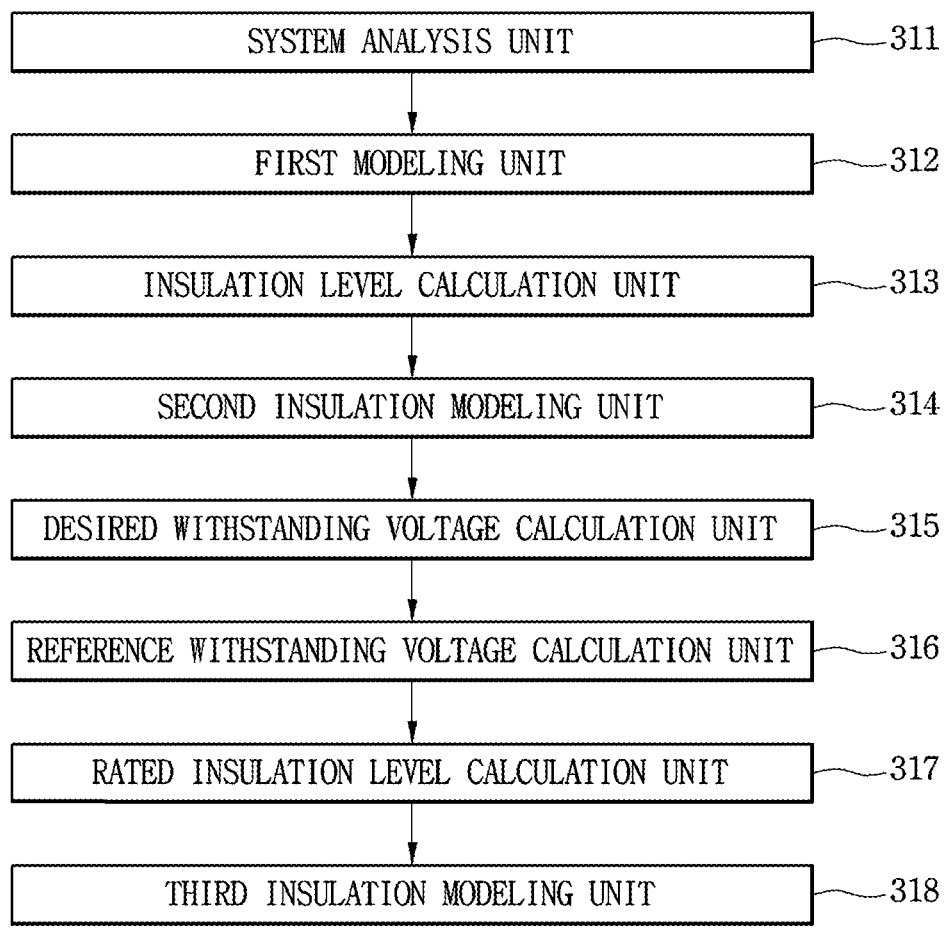
FIG. 15 is a block diagram showing the detailed configuration of the entire system modeling unit in FIG. 14.

FIG. 15 is a block diagram showing the detailed configuration of the entire system modeling unit in FIG. 14.

Referring to FIG. 15, the entire system modeling unit 310 includes a system analysis unit 311, a first insulation modeling unit 312, an insulation level calculation unit 313, a second insulation modeling unit 314, a desired withstanding voltage calculation unit 315, a reference withstanding voltage calculation unit 316, a rated insulation level calculation unit 317, and a third insulation modeling unit 318.

The system analysis unit 311 analyzes the HVDC transmission system 100 and calculates the over voltage and rated voltage of the HVDC transmission system 100.

The first insulation modeling unit 312 models the HVDC transmission system 100 based on the calculated over voltage and the calculated rated voltage and generates the insulation base model of the HVDC transmission system 100.

The insulation level calculation unit 313 performs insulation calculation on the insulation base model of the HVDC transmission system 100 and determines an insulation cooperation withstanding voltage suitable for performing the function of the insulation base model of the HVDC transmission system 100.

The second insulation modeling unit 314 applies the difference between the actual operating state of the HVDC transmission system 100 and the state of the insulation base model of the HVDC transmission system 100 to the insulation base model of the HVDC transmission system 100, modifies the insulation base model of the HVDC transmission system 100, and generates the insulation model of the HVDC transmission system 100.

The desired withstanding voltage calculation unit 315 calculates the desired withstanding voltage of the insulation model of the HVDC transmission system 100.

The reference withstanding voltage calculation unit 316 calculates the reference withstanding voltage of the insulation model of the HVDC transmission system 100 from the desired withstanding voltage of the insulation model of the HVDC transmission system 100.

The rated insulation level calculation unit 170 calculates a rated insulation level satisfying the reference withstanding voltage of the insulation model of the HVDC transmission system 100.

The third insulation modeling unit 318 modifies the insulation model of the HVDC transmission system 100 based on a region-dependent insulation model generated through the region-dependent modeling unit 320 and generates the modified insulation model.

In this case, the third insulation modeling unit 318 modifies the insulation model of the HVDC transmission system 100 based on a variation in impedance on the region of the HVDC transmission system 100 through the region-dependent modeling unit 320, and generates the modified insulation model.

Figure 16:
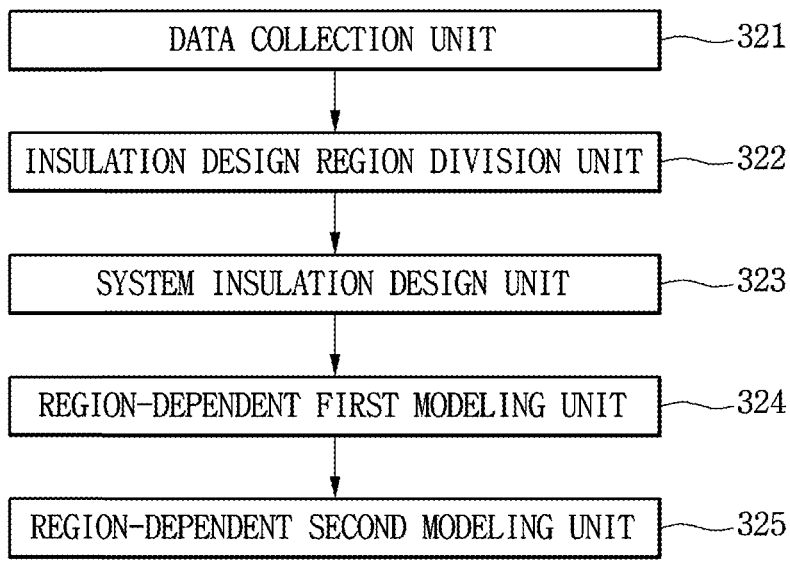
FIG. 16 is a block diagram showing the detailed configuration of the region-dependent modeling unit in FIG. 14.

FIG. 16 is a block diagram showing the detailed configuration of the region-dependent modeling unit in FIG. 14.

Referring to FIG. 16, the region-dependent modeling unit 320 includes a data collection unit 321, an insulation design region division unit 322, a system insulation design unit 323, a region-dependent first modeling unit 324, and a region-dependent second modeling unit 325.

The data collection unit 321 collects data for dividing the HVDC transmission system 100 into a plurality of regions. In other words, the data collection unit 321 collects data to work as a condition for dividing the HVDC transmission system 100 into the regions.

The data collection unit 321 examines the configuration and detailed device specification of the HVDC transmission system 100 and analyzes design impedance accordingly.

Also, the data collection unit 321 selects the positions of each equipment and device, and an arrester, protective facility through a system single line diagram.

The insulation design region division unit 322 divides the HVDC transmission system 100 into a plurality regions based on the data collected through the data collection unit 321.

The insulation design region division unit 322 may divide the HVDC transmission system 100 into a transmission-side AC part 110, a transmission-side transformation part 103, a DC transmission part 140, a reception-side transformation part 105, a reception-side AC part 170, a transmission-side transformer part 120, a transmission-side AC/DC converter part 130, a reception-side DC/AC converter part 150, and a reception-side transformer part 160.

The system insulation design unit 323 classifies and defines a position-dependent stress voltage, and accordingly calculates the region-dependent insulation distance classified through the insulation design region division unit 322.

The region-dependent first modeling unit 324 performs first modeling on each region divided through the insulation design region division unit 322. In this example, the region-dependent first modeling unit 324 performs the first modeling on each region based on a maximum voltage in operation.

The region-dependent second modeling unit 325 applied an environmental factor to perform second modeling on a result of the first modeling.

In this case, the region-dependent second modeling unit 325 examines a variation in insulation distance and generates a region-dependent insulation model.

Figure 17:
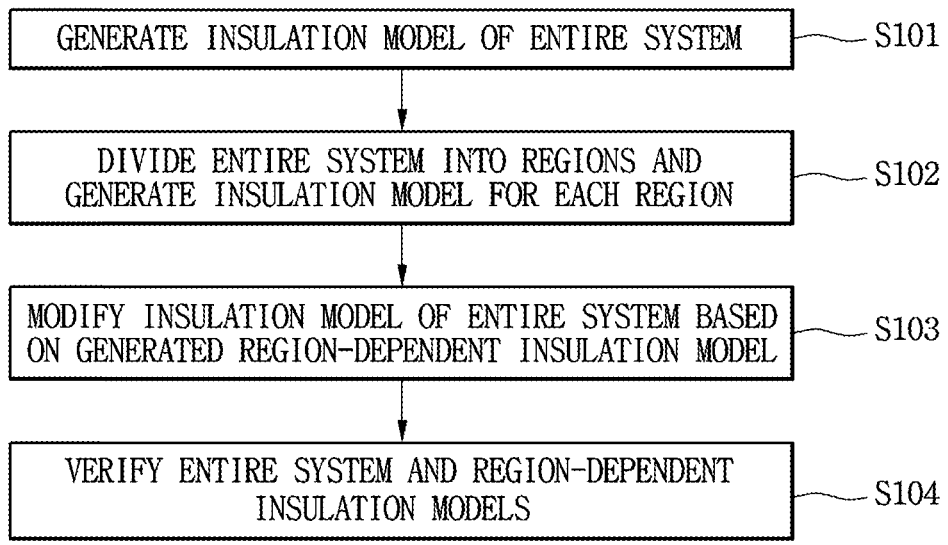
FIG. 17 is a flowchart of an operating method of an insulation design apparatus of an HVDC transmission system according to an embodiment.

FIG. 17 is a flowchart of an operating method of an insulation design apparatus of an HVDC transmission system according to an embodiment.

Referring to FIG. 17, the entire system modeling unit 310 generates an insulation model of the entire configuration of an HVDC transmission system 100 in step S101.

Subsequently, the region-dependent modeling unit 320 divides the entire configuration of the HVDC transmission system 100 into a plurality of regions and generates a region-dependent insulation model for each region in step S102.

When the region-dependent insulation model is generated, the entire system modeling unit 310 modifies an insulation model for the entire configuration according to a change in region-dependent impedance based on the region-dependent insulation model in step S103.

As described above, when the insulation model of the entire system and the region-dependent insulation model are generated, the insulation verification unit 330 performs a verification process on the generated insulation model in step S104. The insulation verification process may verify whether the insulation model of the entire system satisfies a desired withstanding voltage. In this case, an insulation calculation expression based design tool for the verification of the insulation model may be developed and then the verification may be performed by verifying the generated insulation model based on the developed design tool.

Figure 18:
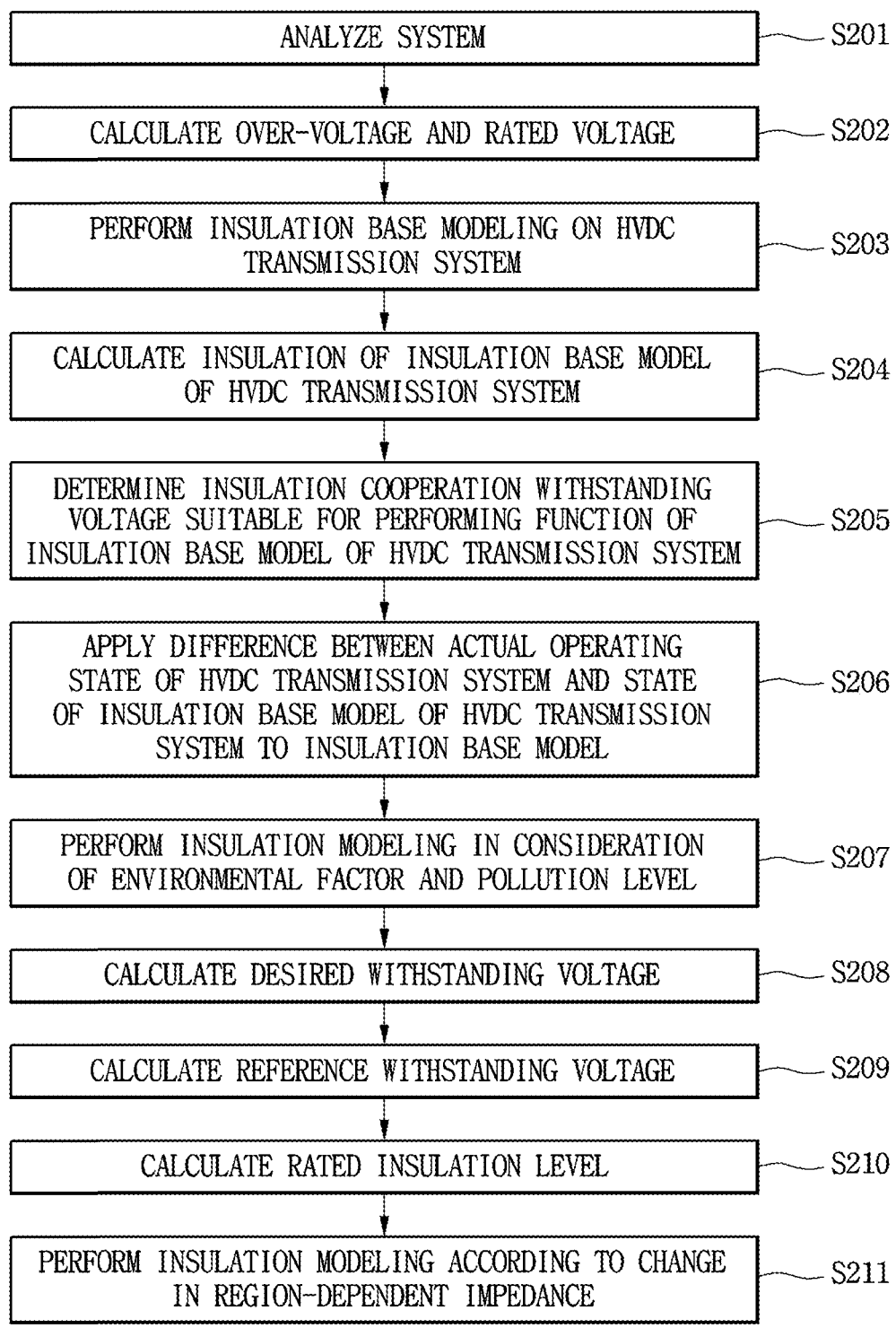
FIG. 18 is a detailed flowchart of an insulation model generation process of the entire system in FIG. 17.

FIG. 18 is a detailed flowchart of an insulation model generation process of the entire system in FIG. 17.

Referring to FIG. 18, the system analysis unit 311 analyzes the HVDC transmission system 100 in step S201 and calculates an over-voltage and a rated voltage in step S202. The system analysis unit 311 may analyze the HVDC transmission system 100 based on at least one of a classified stress voltage, a calculated over-voltage protection level, and an insulation characteristic and calculate the over-voltage and rated voltage.

The first insulation modeling unit 312 models the HVDC transmission system 100 based on the calculated over-voltage and the calculated rated voltage and generates the insulation base model of the HVDC transmission system 100 in step S203.

The insulation level calculation unit 313 performs insulation calculation on the insulation base model of the HVDC transmission system 100 and determines an insulation cooperation withstanding voltage suitable for performing the function of the insulation base model of the HVDC transmission system 100 in step S205. In this case, the insulation level calculation unit 313 may perform the insulation calculation of the insulation base model of the HVDC transmission system 100 based on at least one of the insulation characteristic of the insulation base model of the HVDC transmission system 100, the function of the insulation base model of the HVDC transmission system, the statistical distribution of data on the insulation base model of the HVDC transmission system 100, the inaccuracy of input data of the insulation base model of the HVDC transmission system 100 and a factor affecting a combination of the components of the insulation base model of the HVDC transmission system 100 and determine an insulation cooperation withstanding voltage suitable for performing the function of the insulation base model of the HVDC transmission system 100.

The second insulation modeling unit 314 applies the difference between the actual operating state of the HVDC transmission system 100 and the state of the insulation base model of the HVDC transmission system 100 to the insulation base model of the HVDC transmission system 100 in step S206, modifies the insulation base model of the HVDC transmission system 100, and generates the insulation model of the HVDC transmission system 100 in step S207. The second insulation modeling unit 314 may modify the insulation base model of the HVDC transmission system 100 based on the difference between the actual operating state of the HVDC transmission system 100 and the state of the insulation base model of the HVDC transmission system 100 and the insulation cooperation withstanding voltage, and generate the insulation model of the HVDC transmission system 100. In this case, the difference between the actual operating state of the HVDC transmission system 100 and the state of the insulation base model of the HVDC transmission system 100 may include at least one of a difference in environmental factor of the HVDC transmission system 100, a difference in test of the components of the HVDC transmission system 100, a deviation in product characteristic of the HVDC transmission system 100, a difference in installation state of the HVDC transmission system 100, a difference in operating life of the HVDC transmission system 100, and a safety factor to be considered for the safety of the HVDC transmission system 100. The insulation model of the HVDC transmission system 100 may correspond to an insulation model considering an environmental factor and a pollution level.

The desired withstanding voltage calculation unit 315 calculates the desired withstanding voltage of the insulation model of the HVDC transmission system 100 in step S208.

The reference withstanding voltage calculation unit 316 calculates the reference withstanding voltage of the insulation model of the HVDC transmission system 100 from the desired withstanding voltage of the insulation model of the HVDC transmission system 100 in step S209. The reference withstanding voltage calculation unit 316 may calculate the reference withstanding voltage of the insulation model of the HVDC transmission system 100 from the desired withstanding voltage of the insulation model of the HVDC transmission system 100 based on at least one a test state, a test transformation factor, and a voltage range.

The rated insulation level calculation unit 317 calculates a rated insulation level satisfying the reference withstanding voltage of the insulation model of the HVDC transmission system 100 in step S210. In this case, the rated insulation level may include voltage values and distance values on one or more positions on the HVDC transmission system 100.

The third insulation modeling unit 318 modifies the insulation model of the HVDC transmission system 100 based on a variation in impedance on the divided regions of the HVDC transmission system 100, and generates the modified insulation model in step S211. In this case, the divided section may include at least one of a transmission-side AC part 110, a transmission-side transformation part 103, a DC transmission part 140, a reception-side transformation part 105, a reception-side AC part 170, a transmission-side transformer part 120, a transmission-side AC/DC converter part 130, a reception-side DC/AC converter part 150, and a reception-side transformer part 160.

Figure 19:
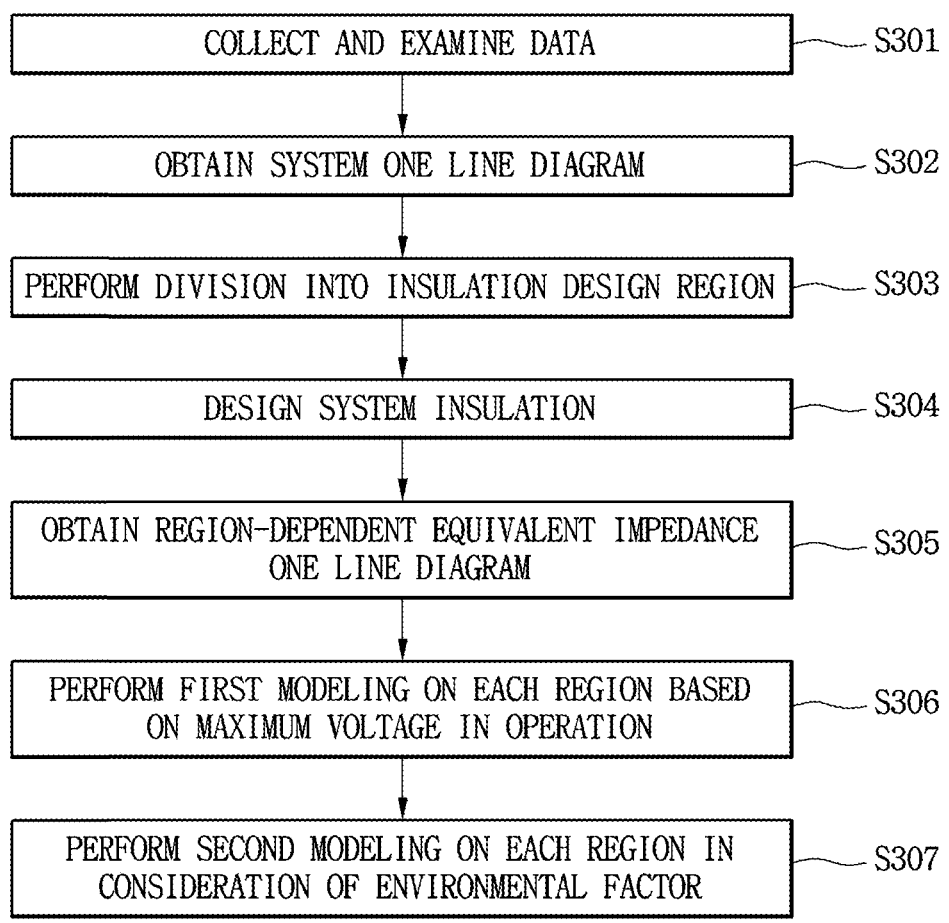
FIG. 19 is a detailed flowchart of a region-dependent insulation model generation process in FIG. 17.

FIG. 19 is a detailed flowchart of a region-dependent insulation model generation process in FIG. 17.

Referring to FIG. 19, a data collection unit 321 collects data for dividing an HVDC transmission system 100 into a plurality of regions according to a specific criterion and examines the collected data in step S301. In this case, the data collection unit 321 examines the configuration and detailed device specification of the HVDC transmission system 100 and analyzes design impedance accordingly.

Then, the data collection unit 321 obtains a system insulation single line diagram in step S302 and selects the positions of HVDC device components and an arrester, accordingly. That is, the data collection unit 321 uses the system insulation single line diagram to select the positions of each facility, a device, and an arrester being a protective facility and select a representative facility based thereon.

The insulation design region division unit 322 divides the HVDC transmission system 100 into a plurality regions based on the data collected through the data collection unit 321 in step S303. The insulation design region division unit 322 may divide the HVDC transmission system 100 into regions, such as a transmission-side AC part 110, a transmission-side transformation part 103, a DC transmission part 140, a reception-side transformation part 105, a reception-side AC part 170, a transmission-side transformer part 120, a transmission-side AC/DC converter part 130, a reception-side DC/AC converter part 150, and a reception-side transformer part 160.

Subsequently, the system insulation design unit 323 classifies and defines the position-dependent stress voltage of the HVDC transmission system 100, and accordingly calculates a region-dependent insulation distance to design system insulation in step S304. The insulation distance may be calculated by separately applying a stress voltage, such as a switching impulse, to each region.

Also, the system insulation design unit 323 obtains a region-dependent equivalent single line diagram based on the maximum value of a device-dependent impedance characteristic in step S305.

In addition, a region-dependent first modeling unit 324 performs first modeling on each region based on a maximum voltage in operation in step S306.

Subsequently, a region-dependent second modeling unit 325 performs second modeling on each region in consideration of an environmental factor and modifies the generated insulation model in step S307.

According to an embodiment, when the insulation design modeling is performed and an insulation design value is applied to the actual system, it is possible to provide convenience.

According to an embodiment, since there is no inconvenience resulting from the need to re-design all variables when a system design, voltage, environmental factor or pollution level varies, it is possible to provide convenience in applying insulation design.

According to an embodiment, by finding an insulation value for a change in applied voltage through modeling in order to remove inconvenience in insulation design, it is possible to provide convenience in insulation design and remove inconvenience in design.

According to an embodiment, by developing an insulation model related to HVDC insulation design and applying the model to an insulation design procedure to verify the design, it is possible to enhance the reliability of design basis compared to a typical design technique.

According to an embodiment, it is possible to decrease inconvenience resulting from the need to design a new system or re-design through much time and cost investment when there is a factor affecting design, compared to a typical technique having no model.

According to an embodiment, by dividing the entire system into a plurality of regions and performing insulation design modeling on each region, it is possible to achieve convenience in applying insulation design because there is a need to separately perform insulation design modeling on only a changed region without re-analyzing the insulation design of the entire system when a target system to be designed is changed.

The above-described embodiments are not limited to the above-described configuration and method, and some or all of the embodiments may also be selectively combined so that various variations may be implemented.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A non-transitory computer-readable medium having instructions stored thereon for execution, by a processor of a high voltage direct current (HVDC) transmission system, to:

generate an insulation model for the entire HVDC transmission system by analyzing the entire HVDC transmission system;

divide the HVDC transmission system into a plurality of regions and perform modeling on each of the plurality of regions to generate a region-dependent insulation model for each of the plurality of regions; and determine whether the region-dependent insulation model generated for each of the plurality of regions satisfies a required voltage condition, re-generate the insulation model for specific regions of the plurality of regions determined to no longer satisfy the required voltage condition by modifying the insulation model based on a change in region-dependent impedance and the region-dependent insulation model without re-analyzing the insulation model of the entire HVDC transmission system, wherein the non-transitory computer-readable medium includes further instructions stored thereon for execution by the processor to:

collect data for dividing the HVDC transmission system into the plurality of regions;

divide the HVDC transmission system into the plurality of regions based on the collected data; and generate the region-dependent insulation model for each of the plurality of regions, wherein the plurality of regions includes at least two of a transmission-side alternating current (AC) portion, a transmission-side transformation portion, a DC transmission portion, a reception-side transformation portion, a reception-side AC portion, a transmission-side transformer portion, a transmission-side AC/DC converter portion, a reception-side DC/AC converter portion, and a reception-side transformer portion.

2. The non-transitory computer-readable medium according to claim 1, having further instructions stored thereon for execution by the processor to separately apply a stress voltage to each of the plurality of regions and calculate a region-dependent insulation distance based on the applied stress voltage.

3. The non-transitory computer-readable medium according to claim 2, having further instructions stored thereon for execution by the processor to:
   generate the region-dependent model for each of the plurality of regions based on a maximum operation voltage; and
   determine a change in insulation distance for each of the plurality of regions based on an environmental factor and modifying the corresponding generated insulation model according to the determined change.

4. The non-transitory computer-readable medium according to claim 1, having further instructions stored thereon for execution by the processor to:
   model the HVDC transmission system based on over-voltage and rated voltage of the HVDC transmission system and generating an insulation base model of the HVDC transmission
   perform an insulation calculation on the generated insulation base model and determine an insulation voltage for performing a function of the generated insulation base model;
   modify the generated insulation base model based on the determined insulation voltage and generate the insulation model for the entire HVDC transmission system;
   calculate an insulation level satisfying a reference voltage of the generated insulation model; and
   calculate the over-voltage and rated voltage of the HVDC transmission system.

5. The non-transitory computer-readable medium according to claim 4, having further instructions stored thereon for execution by the processor to further modify the generated insulation base model based on an insulation voltage and a difference between an actual operating state of the HVDC transmission system and a state of the generated insulation base model to generate the insulation model.

6. The non-transitory computer-readable medium according to claim 5, wherein the difference between the actual operating state and the state of the generated insulation base model system comprises at least a difference in an environmental factor, a difference in test of components, a deviation in product characteristic, a difference in installation state, a difference in operating life or a safety factor.

7. The non-transitory computer-readable medium according to claim 4, having further instructions stored thereon for execution by the processor to:
   calculate a set voltage of the generated insulation model; and
   calculate the reference voltage from the calculated set voltage.

8. The non-transitory computer-readable medium according to claim 7, having further instructions stored thereon for execution by the processor to calculate the reference voltage based on the set voltage and at least a test state, a test transformation factor or a voltage range.

9. The non-transitory computer-readable medium according to claim 4, wherein the calculated insulation level comprises voltage values and distance values of one or more positions on the HVDC transmission system.

10. The non-transitory computer-readable medium according to claim 4, wherein performing calculation comprises calculating based on at least an insulation characteristic of the generated insulation base model a function of the generated insulation base model, a statistical distribution of data on the generated insulation base model, an inaccuracy of input data of the generated insulation base model or a factor affecting a combination of components of the generated insulation base model.

* * * * *